Jan. 6, 1925. 1,522,129
J. C. JONES ET AL
GRASS TRIMMER
Filed Feb. 24, 1922 4 Sheets-Sheet 1

INVENTORS
James C. Jones
Adolf C. Kreutzer
By W. W. Williamson
Atty.

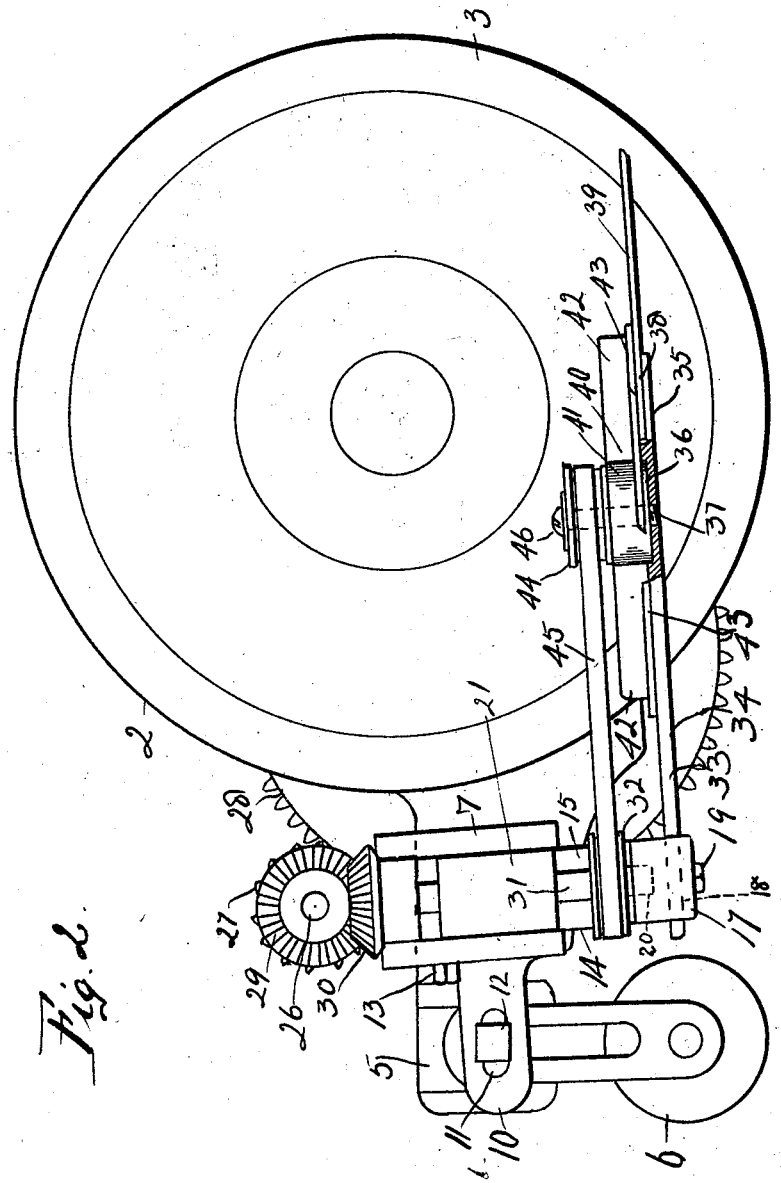

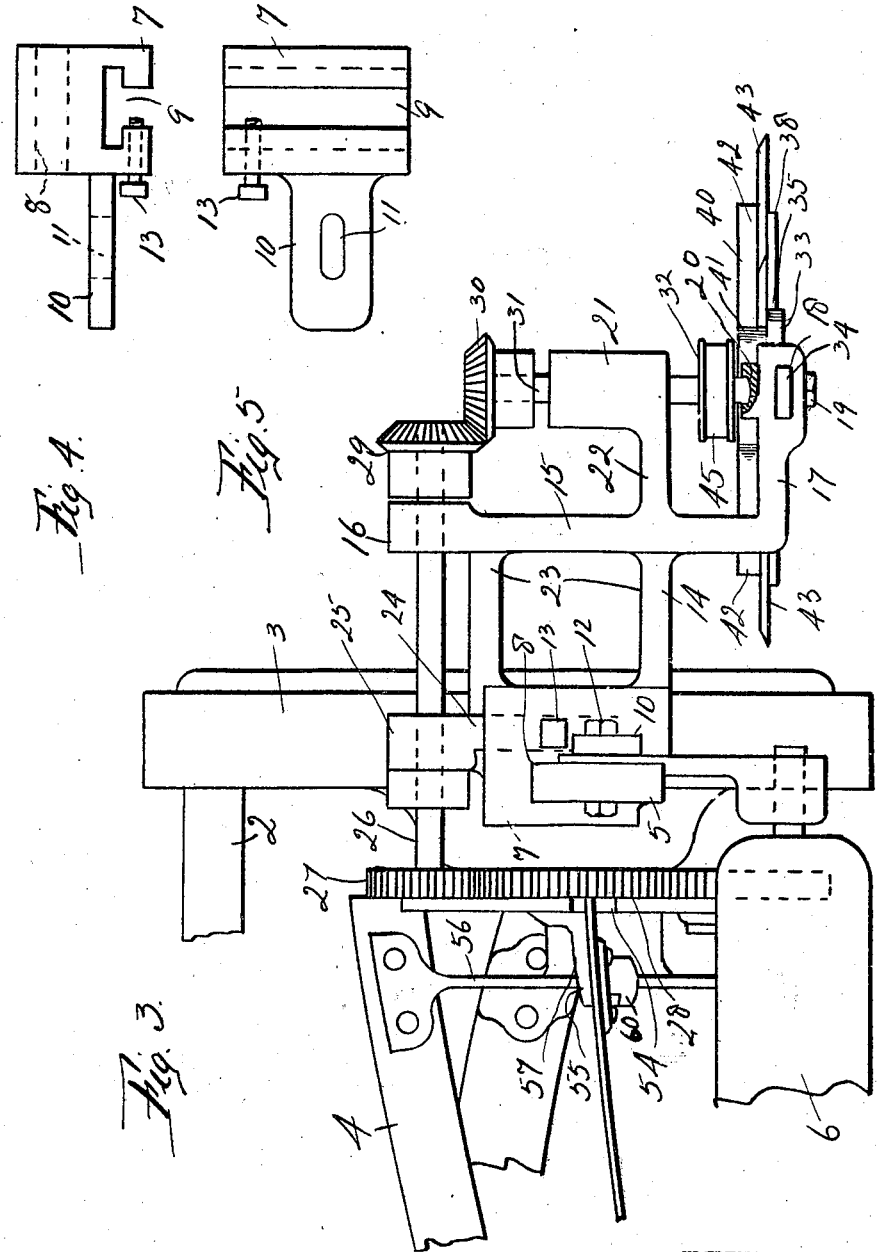

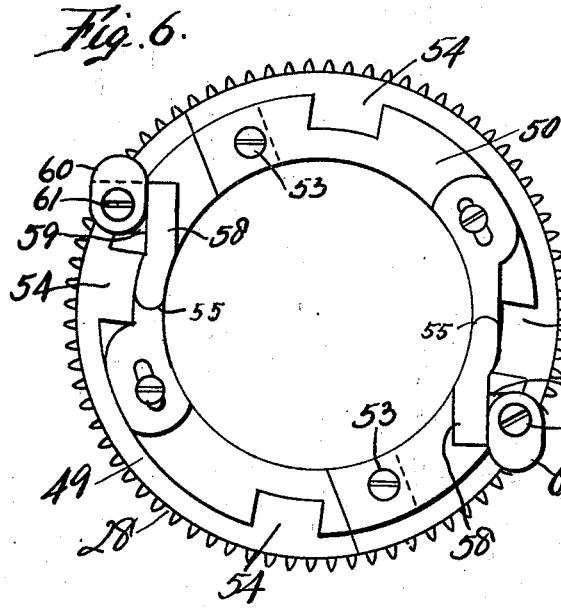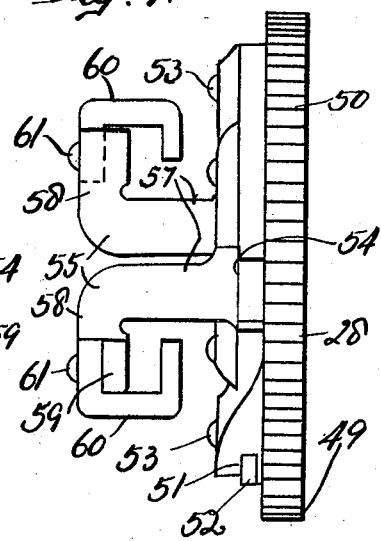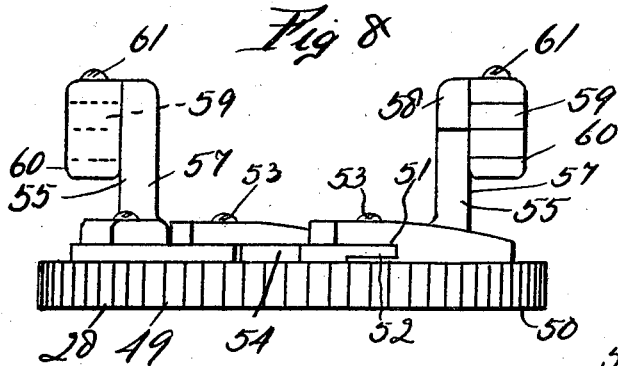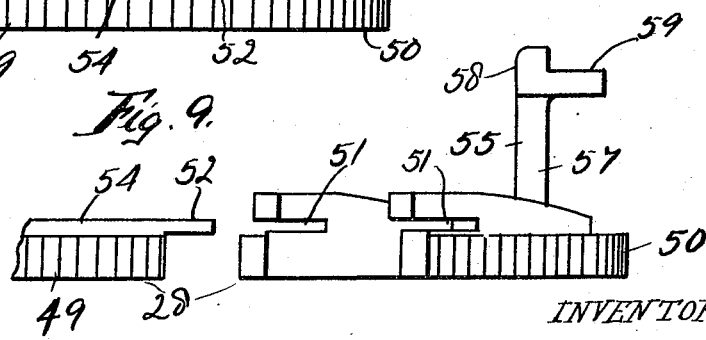

Patented Jan. 6, 1925.

1,522,129

UNITED STATES PATENT OFFICE.

JAMES C. JONES AND ADOLF C. KREUTZER, OF PHILADELPHIA, PENNSYLVANIA.

GRASS TRIMMER.

Application filed February 24, 1922. Serial No. 538,869.

*To all whom it may concern:*

Be it known that we, JAMES C. JONES and ADOLF C. KREUTZER, citizens of the United States, residing at Philadelphia, in the county of Philadelphia and State of Pennsylvania, have invented new and useful Improvements in a Grass Trimmer, of which the following is a specification.

Our invention relates to new and useful improvements in a grass trimmer, and has for its object to provide such a device for detachable or temporary connection with a lawn mower of ordinary construction.

Another object of our invention is to provide means for transmitting motion from the revoluble cutter of the lawn mower to our improved grass trimmer.

A further object of the invention is to provide rotary cutters which revolve above the guide bar and coact therewith to carry out the grass trimming process.

A still further object of our invention is to provide a sectional gear of unique construction for detachable connection with the cutter of the lawn mower through the medium of which motion is transmitted from the revoluble cutter of a lawn mower to the grass trimmer.

With these ends in view, this invention consists in the details of construction and combination of elements hereinafter set forth and then specifically designated by the claims.

In order that those skilled in the art to which this invention appertains, may understand how to make and use the same, we will describe its construction in detail, referring by numerals to the accompanying drawings forming a part of this application, in which:—

Fig. 2, is a side elevation thereof with a portion of the guide bar support broken away and sectioned to illustrate certain details of construction.

Fig. 3, is a rear view of Fig. 1.

Fig. 4, is a plan view of the attaching socket.

Fig. 5, is a side elevation thereof.

Fig. 6, is a face view of the detachable split driving gear.

Fig. 7, is an edge view thereof.

Fig. 8, is also an edge view thereof at right angles to the showing in Fig. 7.

Fig. 9, is an edge view similar to Fig. 8 with the sections of the driving gear slightly separated and a portion of one of said sections broken away with the U shaped clamps removed.

Fig. 10, is an edge view of one of the U shaped clamps.

Figure 1:
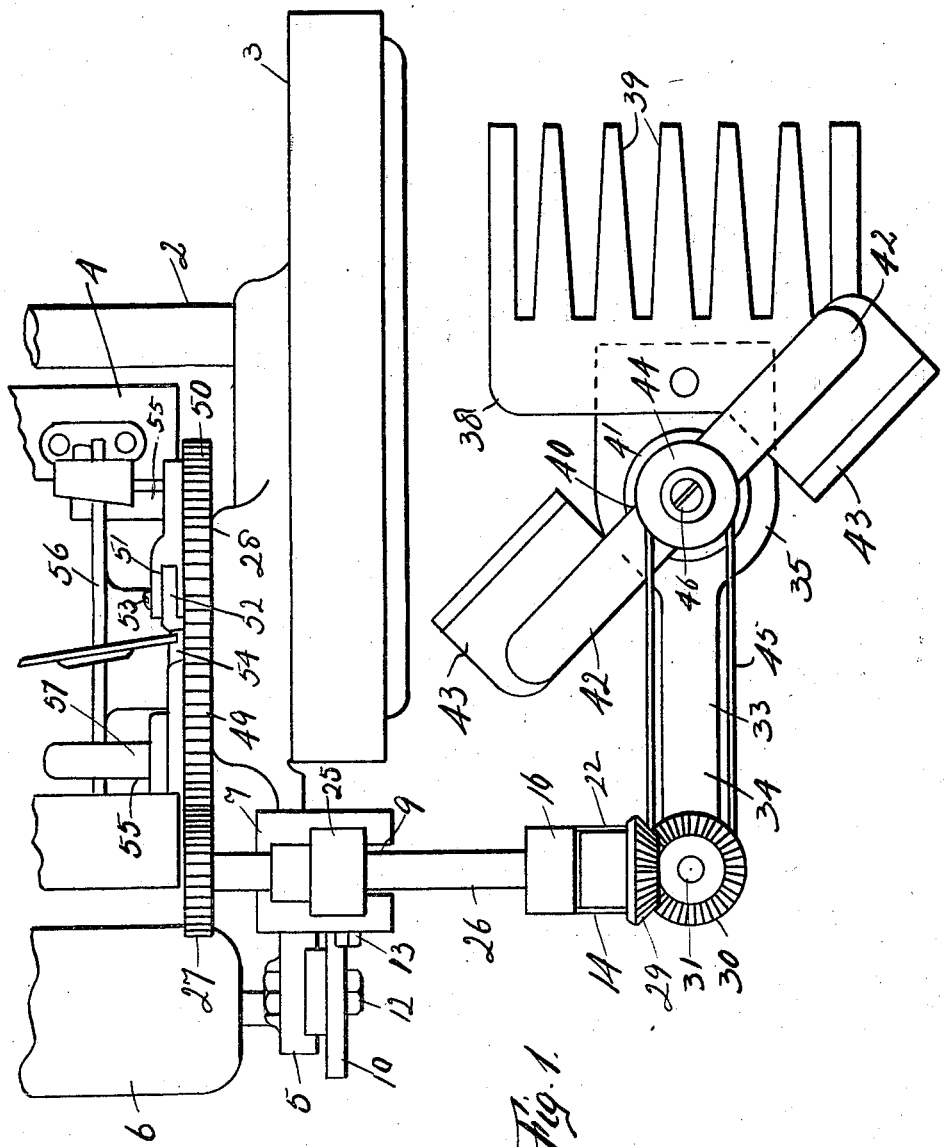
Fig. 1, is a fragmentary plan view of a lawn mower showing our grass trimmer attached thereto.

In carrying out our invention as here embodied, 2 represents a lawn mower of any ordinary or well known construction including a tractor wheel 3 by which power is transmitted in the ordinary way to the revoluble cutter blades 4, a frame 5 and a balancing or supporting roller 6.

On some suitable part of the lawn mower frame 5 is detachably mounted the attaching socket 7, Figs. 4 and 5, having a slot 8 as shown in Fig. 3, for registration with one of the sides of the mower frame and provided with a channel 9 into which fits a suitable part of the grass trimmer to be hereinafter described. This attaching socket is provided with an arm 10 having a hole 11 therethrough for registration with a bolt 12 screwed into the lawn mower frame, the said bolt, as here shown, being the one used for holding the balancing or supporting roller in place and permitting the adjustment of said roller, said screw detachably connecting the attaching socket to the frame of the lawn mower. The set screw 13 or its equivalent is threaded through the body of the attaching socket in the region of the channel 9 and projects into said channel for detachably fastening the grass trimmer to the attaching socket, as will be hereinafter more fully explained.

The grass trimmer frame 14 consists of an upright 15 having a bearing 16 at its upper end and an outwardly projecting foot 17 at its lower end provided with a recess 18 into which projects a set screw 19 or its equivalent, said screw being threaded into the underside of said foot. In the upper side of said foot is formed a cavity 20 in alignment with the bearing 21 carried by the arm 22 projecting from the upright 15 at a suitable point intermediate its ends. Other arms 23 are formed with the upright projecting from the side opposite the arm 22 and said arms 23 having a slide 24 formed therewith which is adapted to register with the channel 9 in the attaching socket for detachably mounting the grass trimmer frame upon the lawn mower and at the upper end of this slide is formed a bearing 25 in alignment with the bearing 16.

In the bearings 16 and 25 is journalled the shaft 26 carrying a spur gear 27 on one end which meshes with the driving gear 28 detachably mounted upon the revoluble cutter of the lawn mower as will be later described. On the other end of the shaft 26 is mounted a beveled gear 29 which meshes with a beveled gear 30 mounted on the upper end of the vertical shaft 31 journalled in the bearing 21 with its lower end projecting into the cavity 20. On the shaft 31 between the foot 17 and the bearing 21 is mounted the pulley 32.

The reference numeral 33 denotes the guide bar support comprising a shank 34 for insertion in the recess 18, where it is securely held in adjustment by the set screw 19, and a head 35 having a circular recess 36 and a threaded hole 37 concentric therewith and to the head of the guide bar support is fastened the guide bar 38 having forwardly projecting fingers 39 by which the grass is guided into the bar and held until cut.

The rotatable blade support 40 has a hub 41 which sets in the circular recess 36 and from this hub project the oppositely disposed arms 42 and to the underside of these arms are secured the cutting blades 43 which revolve in a substantially horizontal plane over the guide bar and its fingers. With the upper end of the hub 41 is formed or connected a pulley 44 and over this pulley and the pulley 32 runs a belt 45 or its equivalent, the said belt preferably being what is known as an endless canvas belt. The cutter blade support is held in place and revolubly mounted upon a screw 46 passing through the pulley 44 and the hub 41 and screwed into the threaded hole 37.

In practice the lawn mover is used in the ordinary manner for cutting the grass but as is well known the grass growing close to walls, buildings, fences and hedges or other plants cannot be cut with the lawn mower making it necessary to afterwards trim the uncut portions with a sickle or shears which is a slow tedious and tiring operation. These are the disadvantages which are overcome by our improved grass trimmer, the latter being readily attached to the lawn mower by inserting the slide 24 in the channel 9 of the attaching socket, said socket normally remaining in place on the lawn mower. When the grass trimmer has been attached to the lawn mower said trimmer projects to one side thereof beyond one of its traction wheels and therefore can be guided along the fence, hedge or other object to trim the grass which was uncut by the mower. This makes it unnecessary for the person cutting the grass to use shears or other implements and relieves the person of the necessity of stooping or kneeling upon the ground. As the lawn mower is moved over the ground motion will be transmitted from the revolving cutter of the lawn mower through the medium of the train of gearing which includes the driving gear 28 and the pulleys and belt 45 to the blade support causing said support and the blades carried thereby to be revolved at a high rate of speed over the guide bar and thus accomplish the cutting or trimming operations.

The particular construction of the driving gear which permits its detachable connection with the lawn mower motor is illustrated in Figs. 6 to 10 inclusive and consists of two sections or segments 49 and 50, the segment 50 having a groove 51 at each of its ends for registration with a tongue 52 at each end of the segment 49 and when said segments are properly positioned relative to one another they are fastened together by screws 53 passing through portions of the segment 50 in the region of the grooves and through the tongue 52. In the rear face of the segments are formed recesses 54 for registration with the ends of the blades of the lawn mower cutter, as shown in Fig. 1. An arm 55 is also carried by each segment which passes part way around a rib of a spider 56 of the lawn mower, said spider forming a part of and located at one end of said cutter. Each arm 55 consists of a shank 57 an extension 58 at the upper end of the shank arranged at right angles to said shank and a lug 59 projecting outwardly from said extension, said lug preferably being of less thickness than the extension.

When the sectional driving gear is in place the lugs 59 are disposed across one face of two of the spider arms and said lugs and the spider arms are then straddled by the U shaped clamp 60 having screws 61 threaded through one of the arms of each clamp and through the lugs 59 so as to securely clamp the parts to the spider of the lawn mower cutter and prevent its accidental displacement.

By constructing the driving gear in this manner the same may be readily placed in position or removed without dismantling any part of the lawn mower.

Of course we do not wish to be limited to the exact details of construction and combination of elements hereinafter set forth and then specifically designated by the claims.

Having thus fully described our invention, what we claim as new and useful is:—

1. A grass trimmer comprising in combination with a lawn mower including a revoluble cutter, an attaching socket detachably secured to the lawn mower frame, a trimmer frame detachably connected with said socket, a guide bar support detachably connected with the trimmer frame and adjustable lengthwise of itself, a guide bar carried by said support, a knife supporting member rotatably journalled upon the guide bar support, a driving gear detachably connected to the revoluble cutter of the lawn mower, means for transmitting motion from the driving gear to the knife support and knife blades carried by the blade support.

2. In combination with a lawn mower including a revoluble cutting member, driving means detachably connected with the revoluble cutting member of the lawn mower, a trimmer frame detachably connected with the lawn mower frame, means carried by said frame for guiding and holding grass, revoluble blades mounted on said guide means, and means for transmitting motion from the driving means to said blades.

3. A grass trimmer comprising, in combination with a lawn mower including a revoluble cutter, an attaching socket detachably secured to the lawn mower frame, a trimmer frame, a slide carried by said trimmer frame for detachably connecting the latter with the lawn mower through the medium of the attaching socket, a horizontal shaft journalled in the trimmer frame, a spur gear on one end thereof, a driving gear detachably connected with the revoluble cutting element of the lawn mower and meshing with said spur gear, a beveled gear on the opposite end of said shaft, a vertical shaft journalled in the trimmer frame, a beveled gear on the upper end of said shaft meshing with the first named beveled gear, a pulley fixed to said vertical shaft, a guide bar support adjustably mounted on the trimmer frame, a guide bar having forwardly projecting fingers fixed to the outer end of the guide bar support, a cutting blade support including a hub having its lower end fitted in a depression in the guide bar support, oppositely projecting arms and a pulley on the upper end of said hub, a screw passing through said pulley and hub and having threaded connection with the guide bar support to act as an axle for the cutting blade support, a blade carried by each of said arms adapted to be revolved above the guide bar and a belt for transmitting motion from the pulley on the vertical shaft to the pulley of the cutting blade support.

In testimony whereof, we have hereunto affixed our signatures.

JAMES C. JONES.
ADOLF C. KREUTZER.